Feb. 24, 1948.  A. V. FIORETTA  2,436,425
HIGH PRESSURE FOUR-WAY VALVE
Filed Sept. 18, 1943  2 Sheets-Sheet 1

INVENTOR.
ALEXANDER V. FIORETTA,
BY
ATTORNEY.

Feb. 24, 1948.  A. V. FIORETTA  2,436,425
HIGH PRESSURE FOUR-WAY VALVE
Filed Sept. 18, 1943  2 Sheets-Sheet 2
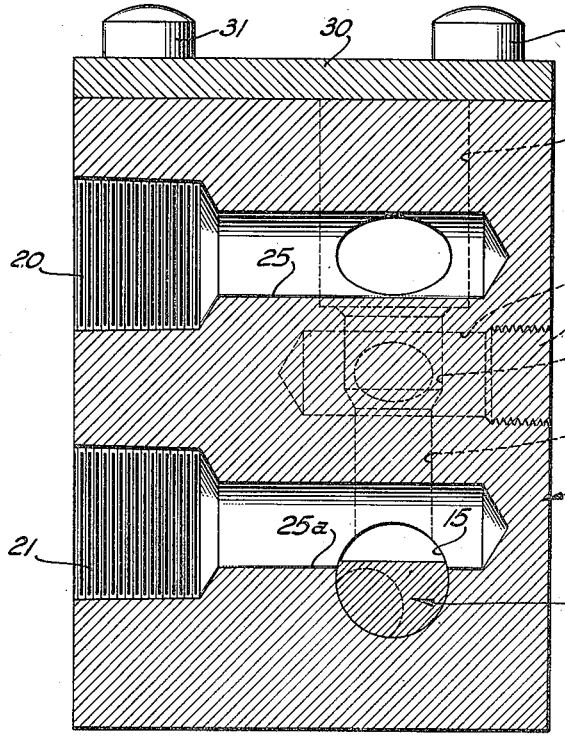
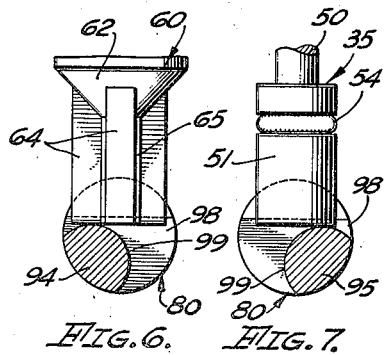
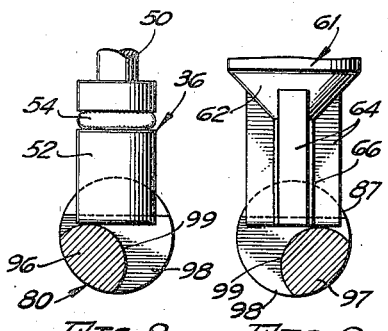
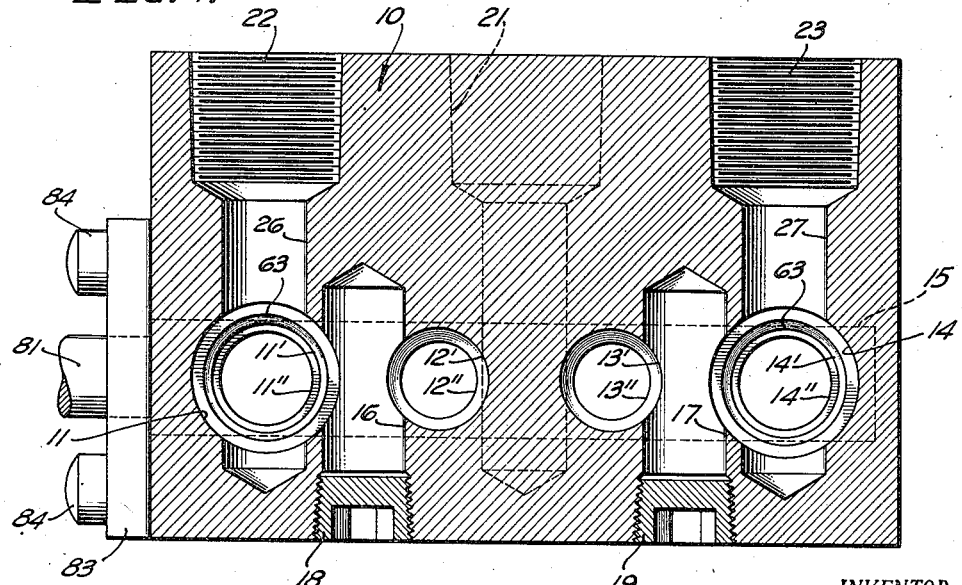
INVENTOR.
ALEXANDER V. FIORETTA,
BY
ATTORNEY.

Patented Feb. 24, 1948

2,436,425

UNITED STATES PATENT OFFICE 2,436,425

HIGH-PRESSURE FOUR-WAY VALVE

Alexander V. Fioretta, West Los Angeles, Calif.

Application September 18, 1943, Serial No. 502,943

4 Claims. (Cl. 277—20)

This invention relates generally to valves, and more particularly to valves of the type comprising a bank of poppet valves arranged typically for four-way operation by means of a single operating member.

The general purpose of the present invention is to provide a precision control valve adapted for handling hydraulic control liquids, such as the special grades of oils now in use for such purpose, under comparatively high pressure, such as being used in modern hydraulic control systems. Typical applications of such valves are found in the hydraulic control systems of modern aircraft, used for such purposes as movement of control surfaces, release of bombs, etc.

The requirements in such service are most exacting, not only because of the high pressures used and the attendant sealing problems, but because of the precision and infallibility with which the system must operate.

A particular object of the invention is the provision of a sturdy and trustworthy hydraulic control valve of the class mentioned, which not only possesses the qualities requisite to the service for which it is intended, but also is relatively simple and inexpensive in construction, as well as light in weight.

The invention is herein exemplified by an illustrative four-way valve shown in the drawings, and wherein.

Figure 1:
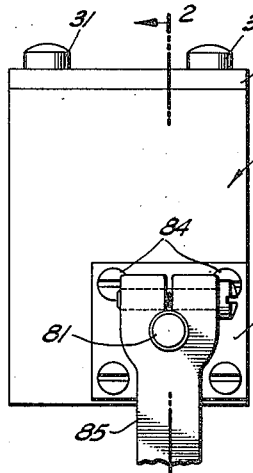
Fig. 1 is an end elevation of the valve.
Figure 2:
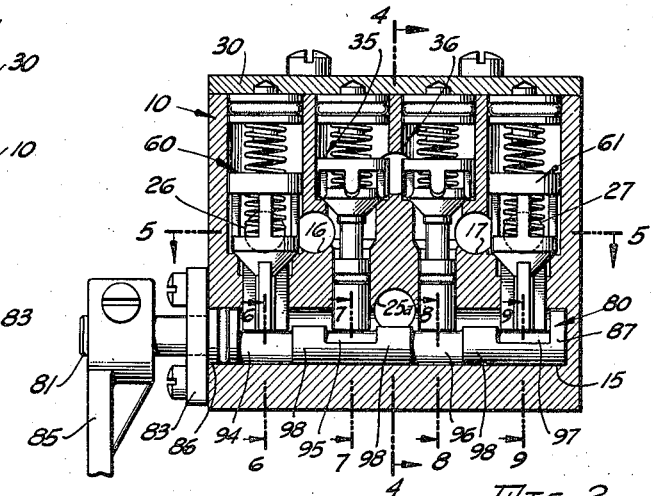
Fig. 2 is a section on line 2—2 of Fig. 1 showing the valve in closed position.

Figs. 4 and 5 are sections on lines 4—4 and 5—5, respectively, of Fig. 2, the poppet valves being omitted;

Figs. 6 to 9 are detail sections taken on lines 6—6 to 9—9, respectively, on Fig. 2.

The illustrative valve shown in the drawings is of a four-way type, designed to permit application and release of fluid pressure simultaneously to and from opposite sides of, for instance, a control piston, or to permit application of fluid pressure to one control piston and to relieve application of fluid pressure from another. From a description of such a particular application of my invention, the broader features thereof will readily be gathered, and it will be readily understood how my invention may be applied in other analogous situations.

In the description, and in certain instances in the claims, I will refer to the top, front, and back sides of the valve, and to certain horizontal and vertical bores. It is of course to be understood that this is for convenience of description and definition only, and not in any way limitative on the invention, since the finished valve may obviously be turned into any position in service.

In constructing the valve of the invention, I preferably provide a valve body in the form of a rectangular block 10 of relatively light metal, as aluminum. A series of four aligned parallel bores 11, 12, 13 and 14 are drilled downwardly in this valve block, parallel to its front face. Bores 11 and 14 extend downwardly approximately half the depth of the block, and are continued by relatively reduced bores 11' and 14', which are in turn continued by further reduced bores 11" and 14", respectively. The bores 12 and 13, on the other hand, extend downwardly in block 10 only approximately one-third of the depth of the block, and there meet with and are continued by reduced bores 12' and 13' which are in turn continued by further reduced bores 12" and 13" respectively. The reduced bores 11" to 14" intersect a bore 15 drilled horizontally into one end of the block 10 and extending nearly to the other end thereof. The axes of the bores 11 to 14 preferably intersect, or nearly intersect, the axis of the bore 15, and the bore 15 is preferably a little larger in diameter than the bores 11" and 14". As here shown, the bores 12" and 13" are a little lesser in diameter than the bores 11" and 14", though this is of no particular significance.

Horizontal bores 16 and 17 are drilled into the front face of the block 10, at approximately half the height of the block, and the spacings and diameters are such that the bore 16 overlaps and cuts through or into the sides of bores 11 and 12', while the bore 17 overlaps and cuts through or into the sides of bores 14 and 13'. Liquid ports are thus formed between bore 16 and each of the bores 11 and 12', and between bore 17 and each of bores 14 and 13'. The outer ends of the ports 16 and 17 are tightly closed by suitable plugs 18 and 19, respectively.

Sunk into the back face of the block 10 are four threaded sockets 20 to 24 to receive the threaded coupling members of external hydraulic lines, not shown. Of these, socket 20 is between and at the same level as the bores 12 and 13, and is continued inwardly by a horizontal reduced bore 25 which intersects bores 12 and 13. Socket 21 is below socket 20, and is continued inwardly by a reduced bore 25a which passes between bores 12" and 13", and intersects horizontal bore 15. The two sockets 22 and 23 are located vertically at about half the height of the block, and are continued inwardly by reduced bores 26 and 27, respectively, which intersect bores 11 and 14, respectively.

Bores 11 to 14 are closed at the top by means of a top or head plate 30 securely fastened down to the block by means of relatively heavy screws 31. Intake poppet valves 35 and 36 are slidably mounted in valve bores 12 and 13, respectively. Preferably, these poppet valve elements are formed of a relatively softer and lighter material than the metal valve body 10, and in the present instance they are composed of a molded plastic. Each of the valves 35 and 36 has a tapered or conical base portion 37, which is adapted to seat on a conical seat 38 formed at the junctures of the valve bores 12 and 13 with reduced bores 12' and 13', respectively. These valve seats thus divide the valve bores or chambers 12, 12' and 13, 13' into upper and lower portions. Above base 37 each of the poppet valve elements has an open topped cage 39 adapted to receive the lower end of a coil compression spring 40. The upper end of each of the springs 40 engages the lower side of a cylindrical or disc-like head 41 located in the upper end of the valve bore and positioned by means of an upwardly projecting stud 42 received in a socket 43 sunk in the under face of cover plate 31. The upper end of the spring 40 encircles and is positioned by a stud 44 projecting downwardly from head 41. The periphery of head 41 is formed with a circumferential groove receiving a rubber O-ring 46 for the purpose of sealing the upper end of the valve bore against the high pressure of the hydraulic liquid. Other sealing means may of course be provided, though that suggested is simple and effective.

The conical base 37 of the two intake poppet valves engage the upper ends of reduced stems 50 extending upwardly from valve stems or plungers 51 and 52 slidably fitted within the bores 12'' and 13'', respectively. For the purpose of sealing the lower ends of the bores 12'' and 13'' against downward leakage of high pressure hydraulic liquid, each of the plungers 51 is here shown as formed with a circumferential groove fitted with a rubber O-ring 54.

Slidably fitted within the valve bores 11 and 14 are exhaust poppet valves 60 and 61 respectively, and as in the case of intake valves 35 and 36, these are preferably constructed of a relatively soft and light material as a suitable molded plastic. Each of these exhaust valves is formed with a downwardly tapering or conical portion 62 adapted for seating engagement with a conical seat 63 formed at the junctures of the valve bores 11 and 14 with reduced bores 11' and 14', respectively. These valve seats thus divide the valve bores or chambers 11, 11' and 14, 14' into upper and lower portions. Extending downwardly from the conical valve portions 62, and slidably fitting within the respective reduced bores 11'' and 14'', are longitudinal fins 64 formed on slender valve stems 65 and 66. These fins 64 define liquid passageways leading downwardly to the bore 15.

The upper portions of the valves 60 and 61 are formed as open-topped cages 70 having enlarged beads 70a at their upper ends which are slidably fitted within the bores 11 and 14. These cages receive the lower ends of compression springs 71, the upper ends of which engage spring positioning and hydraulic sealing heads 41 similar to those previously described in connection with the bores 12 and 13.

The several valves as thus described are simultaneously operated by means of a single operating member in the form of a cam shaft 80 rotatively mounted within the afore-mentioned horizontal bore 15. This cam shaft 80 has a reduced extension 81 projecting from the end of the bore 15, a shoulder 82 being afforded on the shaft flush with the side of the block 10 and being engaged by a retainer plate 83 secured to the side of block 10 as by means of screws 84. An operating arm 85 clamped onto cam shaft extension 81 serves as an external operating member for the valve. Within the block 10, cam shaft 80 has at its two ends cylindrical head portions 86 and 87 rotatably fitted within the bore 15, head 86 at the open end of the bore 15 being provided with a sealing means preferably in the form of a rubber O-ring 89 fitted into a cylindrical circumferential groove in said head. In line with successive valve stems 65, 51, 52 and 66 are separate cams 94 to 97 of this cam shaft.

These four cams are interconnected by three substantially semicylindric bearing portions 98 which have rotational bearing in the bore 15, and which in normal position (Fig. 2) face downwardly. As will be observed from the drawings, the cams 94 to 97 are defined in part by convex faces which extend in continuation of the semicylindric faces of the bearing portions 98, and in part by convex actuating surfaces 99. As appears in Figs. 6–9, the cams project alternately in opposite directions from the central axis of the cam shaft. In the specific embodiment here shown, the cams 94 and 96 extend from points adjacent one edge of the semicylindric bearing portions 98 to substantially the midpoints of the downwardly facing semicylindric faces thereof, and the cams 95 and 97 extend from points adjacent the opposite edges of the portions 98 to substantially the midpoints of said semicylindric faces. The cam shaft being assumed to be in the valve-closed portion of Figs. 2 and 6–9, the semicylindric bearing portions 98 are down, with their diametrical surfaces horizontal; and the cams are in the positions illustrated, with their respective operating surfaces in engagement with the valve stems 51, 52, 65 and 66. The valves are at such time all seated.

Figure 3:
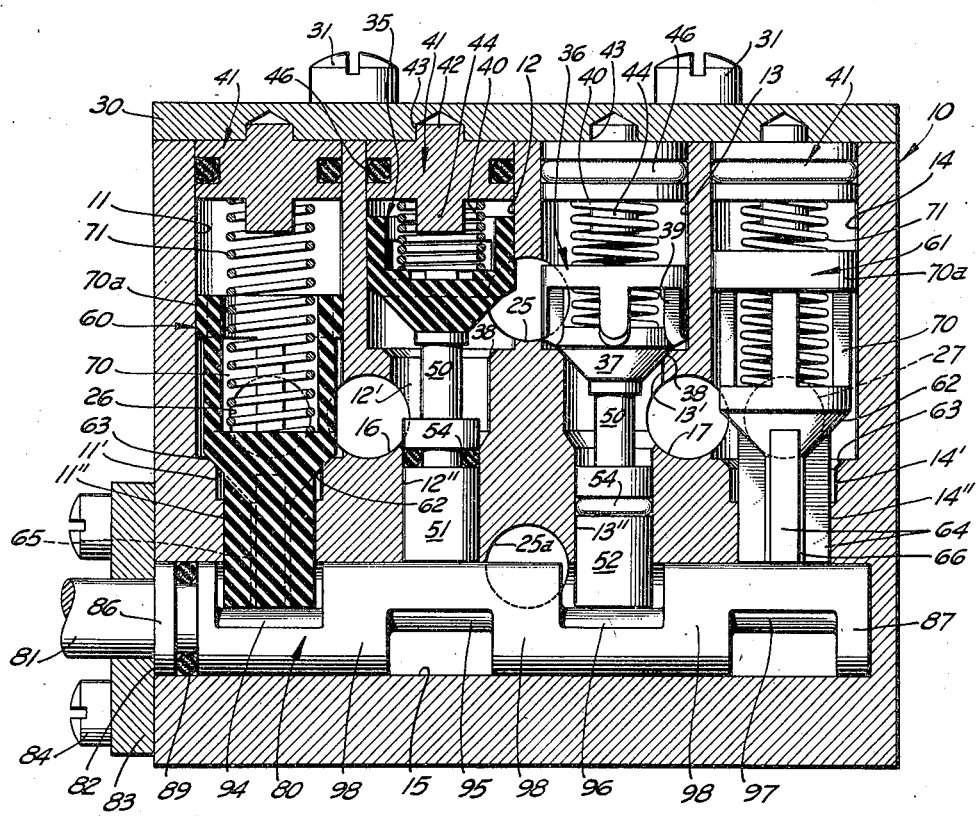
Fig. 3 is a view similar to Fig. 2 but showing the valve in an operating position for one direction of liquid flow.

It will now be evident that rotation of the cam shaft a quarter turn in one direction will elevate two of the cams, either 94 and 96, or 95 and 97, depending upon the direction of rotation, and will merely shift the remaining two cams from one side to the other of the bore 15. The two elevated cams lift one of the intake valve plungers 51 or 52 and one of the exhaust valve stems 65 or 66; as shown in Fig. 3, intake valve 35 and exhaust valve 61 have thus been elevated and unseated. At such time, high pressure liquid entering via passageway 25 flows downwardly in bore 12 past elevated intake valve 35, thence across via the port afforded by bore 16 to valve bore 11, and from there leaves via the valve block passageway 26 (see Fig. 5). This high pressure liquid may go, for instance, to one end of a cylinder containing a work piston, not necessary here to illustrate. From the other end of such a cylinder, liquid will at the same time be exhausted and such liquid is conveyed back to passageway 27 in the valve block (see Fig. 5) whence it flows to valve bore 14, and then downwardly past the unseated valve 61 via the passageway defined by the guide ribs or fins 64 to the cam shaft bore 15. Within the latter, the liquid flows to outlet passageway 25a, whence it is discharged to the low pressure discharge line, not shown. During such operation, the valves 36 and 60 remain necessarily seated, so as to prevent high pressure liquid flow directly from the unseated intake valve 35 past valve 60 to cam shaft bore 15, as well as to prevent high pressure liquid from flowing past intake valve 36, and thence laterally to and downwardly past the unseated exhaust valve 61 to cam shaft bore 15. Rotation of the cam shaft a quarter turn in the opposite direction from the position of Fig. 2 will of course leave valves 35 and 61 seated, and will unseat valves 36 and 60, and in this position of the valves a liquid circulation similar to that previously described but in the reverse direction with respect to the work cylinder will be accomplished.

The valve as now described will be seen to be characterized by simplicity of construction, sturdiness, and ease and precision of operation. The poppet valves, being of plastic construction, cannot wear the permanent seats in the valve, and they are easily replaceable when they become worn. For this purpose, it is only necessary to remove the head plate, whereupon the upper ends of the valve bores are exposed and the poppet valves can be removed and replaced, it not being required to disconnect the external hydraulic lines. This in itself is an advantage of considerable moment. The specific embodiment of the invention here shown for illustrative purposes will of course be understood to be merely illustrative in nature and not restrictive on the invention, various changes in design, structure and arrangement being possible without departing from the spirit and scope of the invention as defined in the appended claims.

I claim:

1. In a valve assembly, the combination of a substantially rectangular valve block formed with two adjacent parallel intake valve bores and two exhaust valve bores outside of and parallel to said intake valve bores, all arranged in a row parallel to the front face of the valve block, and all being drilled downwardly into the top of said block, a head plate secured to the top of said block and closing the upper ends of said bores, an upwardly facing valve seat for a poppet valve around each of said bores dividing said bores into upper portions and reduced lower portions, the valve seats in the intake valve bores being at a higher level than the valve seats in the exhaust valve bores, spring-actuated poppet valves in said bores adapted to seat on said valve seats, a cam shaft bore below and in alignment with said valve bores, guide openings extending from the lower ends of said valve bores to said cam shaft bore, valve actuating stems associated with the intake valves extending with hydraulic sealing fit through the guide openings leading from the intake valve bores and projecting into the cam shaft bore, valve actuating stems associated with the exhaust valves extending with liquid flow clearance through the guide openings leading from the exhaust valve bores and projecting into the cam shaft bore, a cam shaft in said cam shaft bore having individual cams for said valve stems adapted when in one position to allow all of the cams to seat, when rotated in one direction from said position to unseat one intake valve and the nonadjacent exhaust valve, and when rotated in the other direction from said position, to unseat the other intake and exhaust valves, a liquid inlet bore drilled horizontally into said block from the back face thereof and extending between the upper portions of said intake valve bores and intersecting and opening into the sides thereof, a horizontal bore, plugged at its outer end, drilled into the block from the front face thereof between the lower portion of each intake valve bore and the upper portion of the adjacent exhaust valve bore so as to intersect and open into the sides of said portions of said bores and establish communication therebetween, liquid bores drilled into the block from the back face thereof and intersecting the upper portions of the exhaust valve bores, and a liquid passageway in the valve block leading from the cam shaft bore and opening externally of said block.

2. In a valve assembly, the combination of a valve block formed with two adjacent intake valve chambers and two exhaust valve chambers outside of said intake valve chambers, all of said chambers being arranged in line with one another and extending from one face of said block to adjacent the opposite face thereof, a valve seat for a poppet valve around each of said chambers dividing said chambers into upper and lower portions, the valve seats in the intake valve chambers being at a higher level than the valve seats in the exhaust valve chambers, poppet valves in said chambers adapted to seat on said valve seats, a cam shaft bore below and in alignment with said valve chambers, bores extending from the lower ends of said valve chambers to said cam shaft bore, valve-actuating stems associated with the intake valves extending with hydraulic sealing fit through the bores leading from the intake valve chambers and projecting into the cam shaft bore, valve actuating stems associated with the exhaust valves extending with liquid flow clearance through the bores leading from the exhaust valve chambers and projecting into the cam shaft bore, a cam shaft in said cam shaft bore having individual cams for said valve stems, an inlet bore drilled in said block perpendicularly to said valve chambers and intersecting and communicating with the upper portions of said intake valve chambers, a pair of bores drilled in said block perpendicularly to said valve chambers and each intersecting and communicating with the lower portion of one intake valve chamber and the upper portion of the adjacent exhaust valve chamber, a pair of passages extending perpendicularly to said valve chambers and each connecting the upper portion of one exhaust valve chamber to the external surface of said valve block, an exhaust passage perpendicular to and intersecting said cam shaft bore and opening externally of said valve block, springs in said chambers having inner ends engaging said valves to urge the same into fluid sealing engagement with said valve seats, removable spring seats in said chambers engaging the outer ends of said springs, fluid sealing means disposed between the peripheries of said spring seats and the walls of said chambers to form fluid tight seals for the outer ends of said chambers, and a cover plate secured to such one block face and engaging said spring seats to retain the same in fluid sealing engagement with said chambers.

3. In a valve assembly, the combination of a valve block formed with two adjacent intake valve chambers and two exhaust valve chambers outside of said intake valve chambers, all of said chambers being arranged in line with one another and extending from one face of said block to adjacent the opposite face thereof, a valve seat for a poppet valve around each of said chambers dividing said chambers into upper and lower portions, poppet valves in said chambers adapted to seat on said valve seats, spring seat cages integral with the top of each valve and comprising an annular portion united to the valve top by circumferentially spaced longitudinal struts to provide fluid flow openings, springs in said chambers having inner ends seated in said cages to urge said valves into fluid sealing engagement with said valve seats, removable spring seats in said chambers engaging the outer ends of said springs, fluid sealing means disposed between the peripheries of said spring seats and the walls of said chambers to form fluid tight seals for the outer ends of said chambers, and a cover plate secured to such one block face and engaging said spring seats to retain the same in fluid sealing engagement with said chambers.

4. In a valve assembly, the combination of a valve block formed with two adjacent intake valve chambers and two exhaust valve chambers outside of said intake valve chambers, all of said chambers being arranged in line with one another and extending from one face of said block to adjacent the opposite face thereof, a valve seat for a poppet valve around each of said chambers dividing said chambers into upper and lower portions, the valve seats in the intake valve chambers being at a higher level than the valve seats in the exhaust valve chambers, spring-actuated poppet valves in said chambers adapted to seat on said valve seats, a cam shaft bore below and in alignment with said valve chambers, bores extending from the lower ends of said valve chambers to said cam shaft bore, valve-actuating stems associated with the intake valves extending with hydraulic sealing fit through the bores leading from the intake valve chambers and projecting into the cam shaft bore, valve actuating stems associated with the exhaust valves extending with liquid flow clearance through the bores leading from the exhaust valve chambers and projecting into the cam shaft bore, a cam shaft in said cam shaft bore having individual cams for said valve stems, a pair of passages extending perpendicularly to said valve chambers and each connecting the upper portion of one exhaust valve chamber to the external surface of said valve block, an inlet bore drilled into said valve block perpendicular to and substantially centrally between the upper portions of said intake valve chambers, said bore having a diameter greater than the distance between said intake valve chamber upper portions whereby said bore intersects both intake valve chamber upper portions, a pair of bores drilled into said valve block, each perpendicular to and substantially centrally between the lower portion of one intake valve chamber and the upper portion of the adjacent exhaust valve chamber, said bores having a diameter greater than the distance between such respective intake and exhaust valve chamber portions whereby to intersect and establish communication therebetween, an exhaust passage perpendicular to and intersecting said cam shaft bore and opening externally of said valve block, spring seat cages integral with the top of each valve and comprising an annular portion united to the valve top by circumferentially spaced longitudinal struts to provide fluid flow openings, springs in said chambers having inner ends seated in said cages to urge said valves into fluid sealing engagement with said valve seats, removable spring seats in said chambers engaging the outer ends of said springs, fluid sealing means disposed between the peripheries of said spring seats and the walls of said chambers to form fluid tight seals for the outer ends of said chambers, and a cover plate secured to such one block face and engaging said spring seats to retain the same in fluid sealing engagement with said chambers.

ALEXANDER V. FIORETTA.

REFERENCES CITED

The following references are of record in the file of this patent:

UNITED STATES PATENTS

| Number | Name | Date |
| --- | --- | --- |
| 892,594 | Killian | July 7, 1908 |
| 2,132,766 | Stroup | Oct. 11, 1938 |
| 2,299,719 | Frimel | Oct. 20, 1942 |
| 2,302,663 | Campbell | Nov. 24, 1942 |
| 2,321,267 | Van Der Werff | June 8, 1943 |
| 2,338,101 | Ellinwood | Jan. 4, 1944 |
| 2,354,960 | Morehouse | Aug. 1, 1944 |
| 2,376,322 | Benaway | May 22, 1945 |

FOREIGN PATENTS

| Number | Country | Date |
| --- | --- | --- |
| 445,559 | Great Britain | Apr. 14, 1936 |